(12) United States Patent
Heise (10) Patent No.: US 7,826,520 B2
(45) Date of Patent: Nov. 2, 2010

(54) METHOD AND SYSTEM FOR SUPPRESSING AN INTERFERENCE SIGNAL

(75) Inventor: Bernd Heise, München (DE)

(73) Assignee: Infineon Technologies AG, Munich (DE)

( * ) Notice: Subject to any disclaimer, the term of this patent is extended or adjusted under 35 U.S.C. 154(b) by 1082 days.

(21) Appl. No.: 11/489,419

(22) Filed: Jul. 19, 2006

(65) Prior Publication Data
US 2007/0019718 A1     Jan. 25, 2007

(30) Foreign Application Priority Data
Jul. 20, 2005    (DE) ........................ 10 2005 034 506

(51) Int. Cl.
H04B 1/38    (2006.01)
H04K 1/10    (2006.01)
(52) U.S. Cl. ..................................... 375/222; 375/260
(58) Field of Classification Search ................. 375/219, 375/222, 260, 262, 265; 370/278, 282, 286, 370/289; 379/93.01, 93.08, 406.05, 406.06, 379/406.12, 406.13, 399.01, 399.02, 402
See application file for complete search history.

(56) References Cited

U.S. PATENT DOCUMENTS 6,985,548 B1 *    1/2006    Jabbar et al. ................. 375/355

2003/0016673 A1    1/2003    Pendakur et al.
2005/0276340 A1 *    12/2005    Chow et al. ................. 375/260

FOREIGN PATENT DOCUMENTS

EP    0 966 135    6/1999
GB        910453    6/1961

OTHER PUBLICATIONS

"Periodic Impulse Noise: How predictable is it?", ITU SG15/Q4 contribution D-035, Geneva, Switzerland, Nov. 2004.
"Multi-Rate Impulse Protection", ITU SG15/Q4 contribution HH-081, Waikiki, Hawaii, Jan. 2005.
"When to Incorporate frame-blanking in VDSL2", ITU SG15/Q4 contribution HA-094, Huntsville, Alabama, Mar. 2005.
"Frame-blanking: A Simple and Effective Method of REIN Protection", ITU SG15/Q4 contribution HA-093, Huntsville, Alabama, Mar. 2005.

* cited by examiner

*Primary Examiner*—Young T. Tse
(74) *Attorney, Agent, or Firm*—Jenkins, Wilson, Taylor & Hunt, P.A.

(57) ABSTRACT

In a method for suppressing an interference signal during a transmission of data symbols between two transceivers, a transmit data symbol sequence is transmitted from a first transceiver to a second transceiver. An interference signal, which has occurred during the transmission of the transmit data symbol sequence, is detected in dependence on a received data symbol sequence, and the data symbol of the transmit data symbol sequence, which data symbol was transmitted last, is repeatedly transmitted from the first transceiver to the second transceiver when the interference signal occurs.

18 Claims, 6 Drawing Sheets

METHOD AND SYSTEM FOR SUPPRESSING AN INTERFERENCE SIGNAL

BACKGROUND OF THE INVENTION

The invention relates to a system and to a method for suppressing a periodically occurring interference signal during a bidirectional data transmission of data symbols between two xDSL transceivers.

The generic term xDSL combines in it a multiplicity of transmission systems for the twin copper wire of the telephone subscriber line network. The abbreviation DSL (digital subscriber line) indicates that information is transmitted in digital form. The most well-known xDSL technologies are ADSL (asymmetrical digital subscriber line), HDSL (high-bit rate digital subscriber line) and VDSL (very high-bit rate digital subscriber line).

Figure 1:
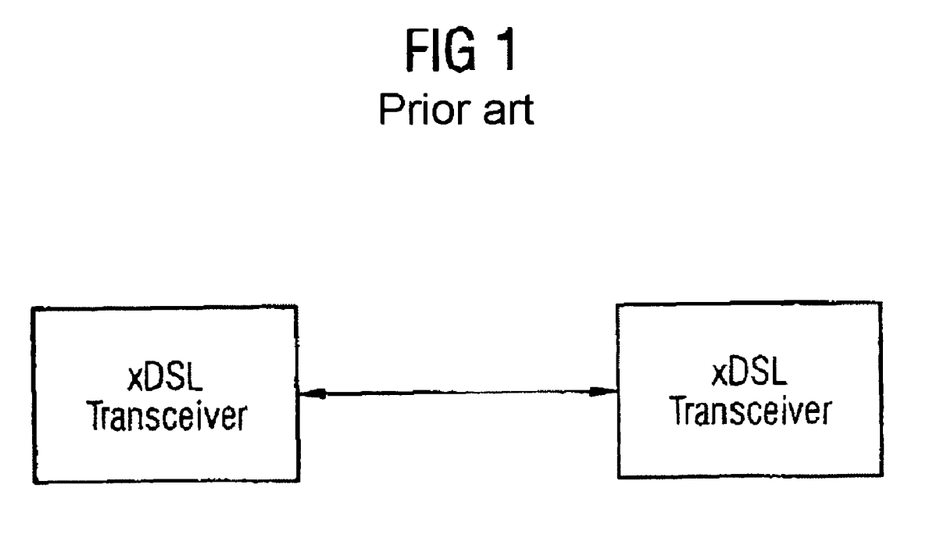
FIG. 1, as discussed above, is the data transmission between two conventional xDSL transceivers.

FIG. 1 shows the bidirectional data transmission between two conventional xDSL transceivers via a data transmission medium. In DSL, data are transmitted in full-duplex mode which can be implemented without mutual influence as a supplement to previous telephone signal transmission. In DSL, data are transmitted in a first data transmission channel, the forward channel, from a network node to a subscriber line and, conversely, data are transmitted from the subscriber line to the network node in a reverse channel. Various variants can be distinguished in dependence on the bit rate of the forward channel. If forward and reverse channel have the same bit rate, this covers SDSL (symmetrical DSL). Since DSL is primarily designed for demand services, a lower bit rate is normally used for the reverse channel than for the forward channel. For this reason, the forward channel has a higher bit rate than the bit rate in the reverse channel in an ADSL system. VDSL systems mainly bridge the data transmission link between cable branches and customers whereas HDSL and ADSL transmit data mainly from the exchange to the customer or subscriber.

The standardized transmission method for transmitting data with ADSL and VDSL2 is the multi-carrier method DMT (discrete multi-tone transmission). In this method, the frequency band is divided into a number of bands, the lowest frequency band being provided for transmitting the conventional telephone signal POTS (plain old telephone service). This is followed by the frequency bands for the uplink or reverse channel and the downlink or forward channel. In DMT, the frequency bands are subdivided into up to 4095 subchannels, each subchannel having a frequency bandwidth of 4.3125 kHz. In each subchannel, modulation is performed by means of QAM (quadrature amplitude modulation).

Figure 2:
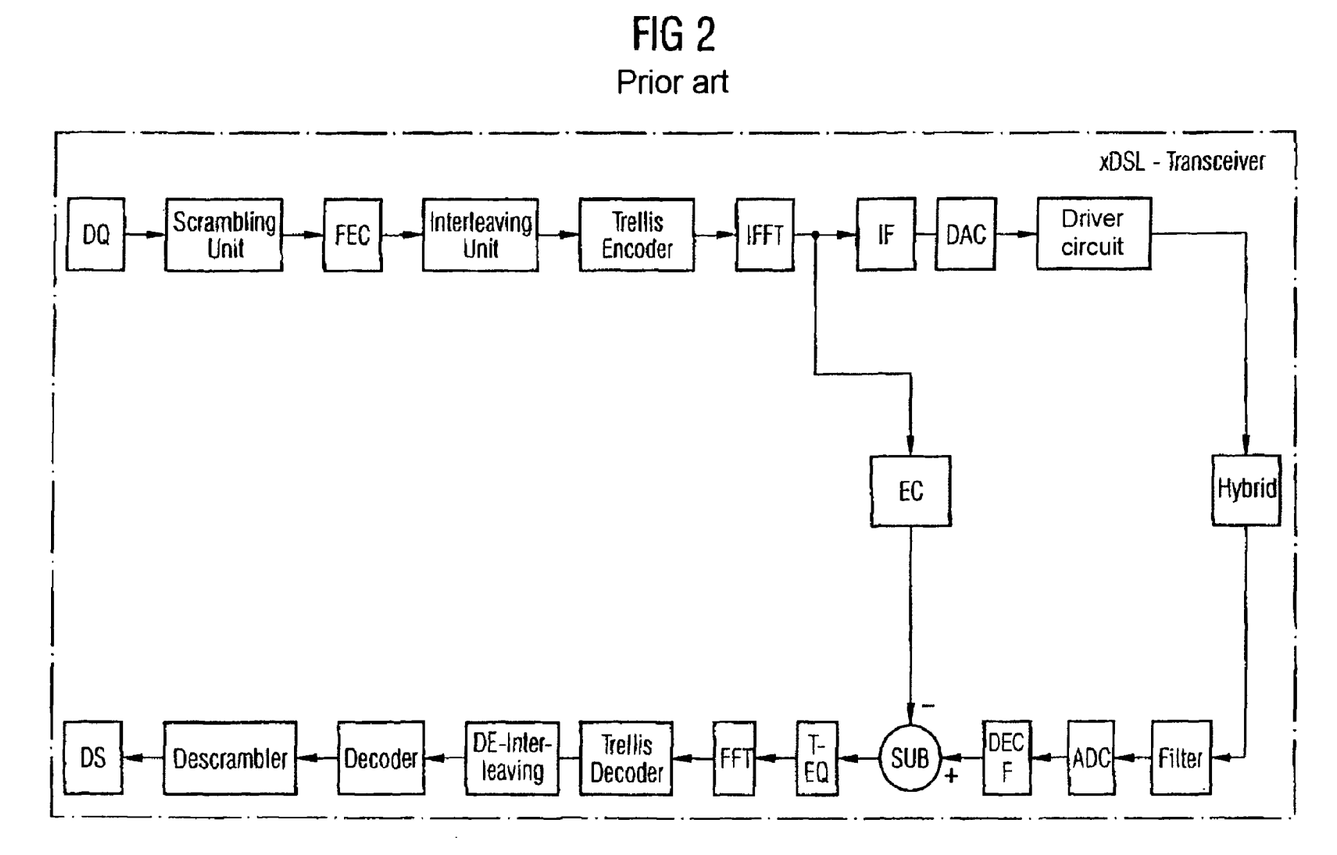
FIG. 2, as discussed above, is a block diagram of a conventional xDSL transceiver.

FIG. 2 shows a conventional xDSL transceiver.

The conventional xDSL transceiver has a transmit signal path and a receive signal path. In the transmit signal, a data source delivers a data signal to a scrambler which scrambles the data. The scrambler eliminates long sequences of zeros or ones. During the scrambling, the original order of the data bit stream is altered in accordance with a selected algorithm. Long sequences of zeros or ones are converted in such a manner that frequent signal changes occur. Furthermore, the transmit signal contains a forward error correction unit FEC which, for example, performs Reed-Solomon coding. Reed-Solomon coding enables data transmitted with errors to be corrected. In particular, the Reed-Solomon codes allow error bursts to be corrected such as occur, for example, with DMT. Reed-Solomon codes provide for so-called forward error correction, i.e. error correction does not require a reverse channel. Test numbers are calculated which are appended to a data block to be protected and are transmitted together with this block. The Reed-Solomon code word transmitted therefore consists of useful data and test data.

The data bits to be transmitted are interleaved in the time domain by an interleaving unit. The interleaver distributes the code words of the Reed-Solomon encoder over a greater range of time so that any transmission disturbances which may occur are distributed over a number of code words.

A trellis encoder inserts further redundancy into the data stream. The additional bits are then used in the receiver for error correction. Whereas the Reed-Solomon encoder operates by block, i.e. adds a block of test bites to a defined data block, and thus performs block encoding, the trellis coder performs convolution coding. The data to be protected are continuously linked to a protection polynomial so that redundancy bits are permanently inserted into the data stream.

A block of data bits to be transmitted which is delivered by the trellis encoder is temporarily stored in a data buffer with the transmit signal. In a QAM encoder, a QAM symbol is generated for each carrier of the DMT data transmission system, i.e. a pointer is generated in the constellation diagram or, respectively, a complex number is generated. A QAM encoder produces the spectral lines of the signal to be transmitted with complex numerical values. The spectrum thus generated is transformed into a time domain signal with an IFFT (inverse Fourier transformation from the frequency domain to the time domain) unit. The samples of the time domain signal thus produced are successively interpolated by an interpolation filter IF and converted into analogue signals and are sent out after low-pass filtering.

Conversely, a low-pass filtered time domain signal is sampled on the receiving end of the xDSL transceiver and read into a signal buffer after decimation by means of a decimation filter. The low-pass filter reduces aliasing effects so that spectral components outside the frequency band used do not noticeably corrupt the sampled signal. One data block of N samples is in each case transformed into the frequency domain by means of FFT (fast Fourier transformation). Each spectral line of the discrete spectrum thus calculated represents a QAM data symbol from which a bit combination is then obtained. The operations performed in the transmit signal path are performed in the reverse order in the receive signal path. The receive signal path, therefore, contains a frequency equalizer, a trellis decoder, a deinterleaving unit, a decoder and a descrambler.

The transmit signal path and the receive signal path are connected to the two-wire telephone line via a hybrid. Signal components of the signal sent out by the transmitter of the xDSL transceiver are reflected on the transmission link and form echo signals. These echo signals pass via the hybrid into the receive signal path where they lead to disturbances. The xDSL transceiver, therefore, contains an echo compensation filter EC which calculates from the transmitted signal the echo signal to be expected, the calculated echo signal then being subtracted from the receive signal by means of a subtractor. The form and the duration of the echo signal depend on the configuration of the subscriber line. The echo compensation filter EC is therefore preferably constructed to be adapted and can then be adapted to the respective echo signal characteristic to be expected.

The conventional xDSL transceiver also contains in the receive signal path an equalizer EQ for compensating for linear distortions in the receive signal in the time domain.

During the data transmission between two conventional xDSL transceivers via two-wire telephone lines within a bundled cable, electromagnetic disturbances which can lead to bit errors during the data transmission occur due to electrical coupling from other systems which transmit data in the same bundled cable or from other systems such as, for example, radio or TV transmitters or other electrical devices. The Reed-Solomon coders provided in ADSL and VDSL transceivers insert redundancy into the data stream in order to be able to correct a particular density of errors. The large proportion of the interference signals coupled into the two-wire telephone line consists of periodically occurring interference pulses which are generated, for example, by switching processes in devices. These interference signals are coupled into the telephone lines which are in the vicinity at the subscriber. Typical devices which generate periodic interference signals are dimmers, neon tubes and switched-mode power supplies.

Even short interference pulses can corrupt or destroy a complete DMT data symbol so that a large number of data bit errors are produced. Periodically occurring interference signals are also called REIN (repetitive electrical impulse noise) signals.

The methods for suppressing interference signals hitherto used do not utilize the periodicity of the interference pulses for reducing the expenditure in order to minimize or prevent transmission errors. The coding methods used in xDSL transceivers such as, for example, FEC coding methods, do not locate the interference signal but only insert sufficient redundancy for error correction into the bit stream. During the redundant coding, the interleaver distributes the disturbed data over as many code words as possible since each code word only has a limited possibility for error correction. Adding redundancy and interleaving by means of interleavers increases the run time during the data transmission.

To minimize the run times and to minimize the technical expenditure or complexity during the coding, a method for suppressing interference signals during ADSL and VDSL data transmission has been proposed, therefore, in 2Wire, "Periodic Impulse Noise: How predictable is it?" ITU SG15/Q4 contribution D-035, Geneva, Switzerland, November 2004, in 2Wire, "Multi-Rate Impulse Protection", ITU SG15/Q4 contribution HH-081, Waikiki, Hawaii, January 2005, 2Wire, "When to incorporate frame-blanking in VDSL2", ITU SG15/Q4 contribution HA-094, Huntsville, Ala., March 2005 and in 2Wire, "Frame-Blanking: A Simple and Effective Method of REIN Protection", ITU SG15/Q4 contribution HA-093, Huntsville, Ala., March 2005, in which certain data transmission symbols are not used for data transmission if the occurrence of an interference pulse is expected.

Figure 3:
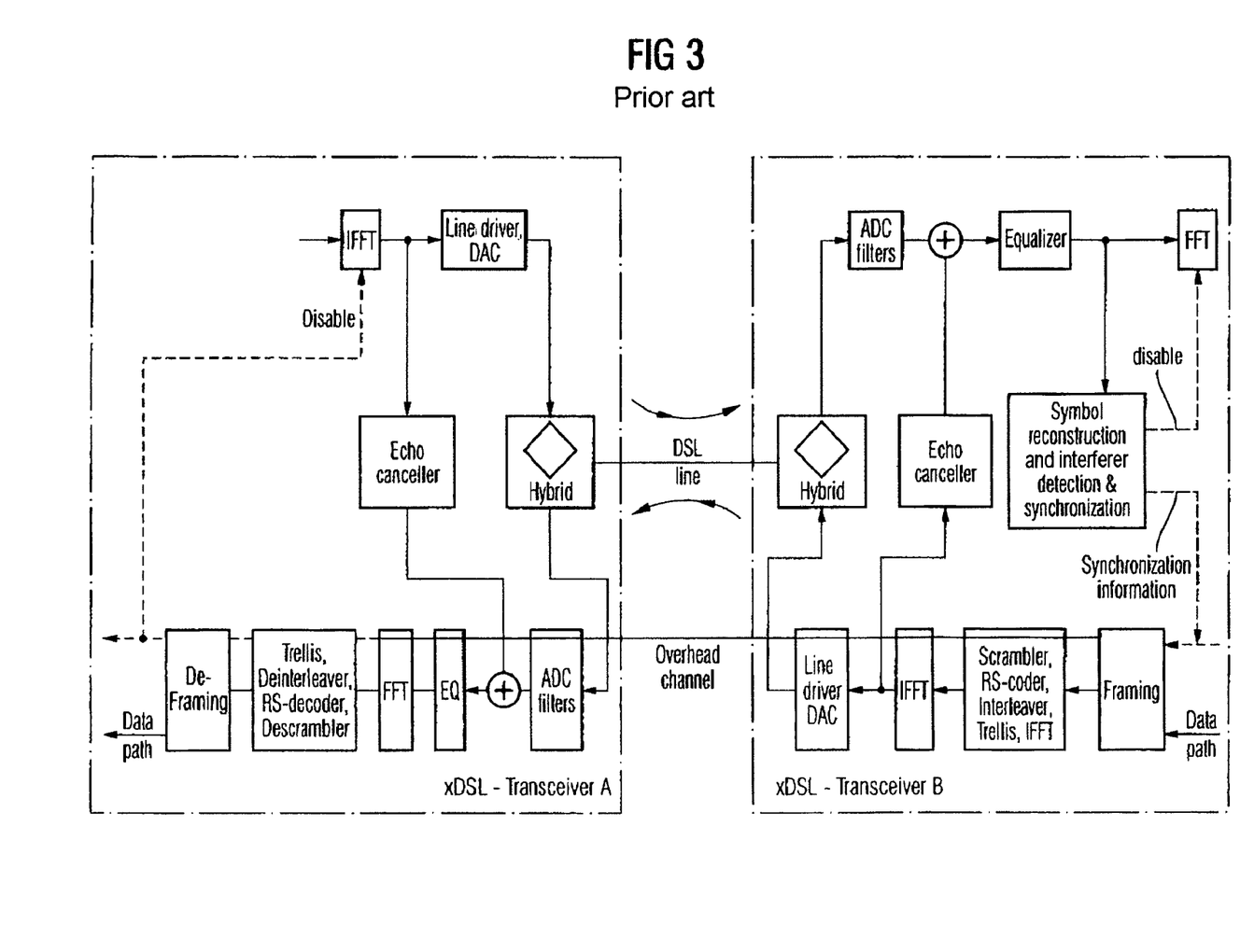
FIG. 3, as discussed above, is a block diagram of a conventional data transmission system.

FIG. 3 shows a conventional data transmission system for transmitting data between two xDSL transceivers, in which, after echo compensation and equalization in the transceiver B, a signal is picked up for interference signal detection. When the periodic occurrence of an interference pulse or of an interference signal is detected, its position and period is reported to the transceiver A at the other end of the DSL line via an overhead channel. From this, the transceiver A internally generates a synchronization signal and periodically delivers a disable control signal to the IFFT unit on its transmit signal path. Instead of the transmit data symbol which is presumably corrupted during the data transmission via the data transmission channel due to the interference signal, either no data symbol, a permanently defined data symbol or a randomly generated data symbol is transmitted. The random data symbol contains random values. The data symbol does not contain any useful data in any of the cases mentioned.

A disadvantage of this known method for suppressing interference signals according to the prior art consists in that, in the case where an interference pulse lies on the boundary between two successive data symbols or overlaps the two data symbols, neither one of the successive data symbols can be used any longer for useful data even if the interference pulse is shorter than a data symbol.

In Europe, the mains frequency $fN$ is 50 Hz and in the US is 60 Hz. A dimmer which switches at a frequency $fN$ of 50 Hz and causes an interference signal with each rising switching edge and each falling switching edge generates an interference signal with an interference frequency $fS$ of 100 Hz in Europe and 120 Hz in the US. On the data transmission line, therefore, an interference pulse, which is caused, for example, by a dimmer, occurs every 10 ms (in Europe). If the data symbol length $T_D$, for example in ADSL, has a duration of 250 µs, an interference pulse occurs every 40 data symbols. If the interference pulse is located on the boundary of two data symbols or overlaps two data symbols, two data symbols are not transmitted in a conventional method. Thus, two of 40 data symbols are not transmitted. This corresponds to a data loss of 5%.

BRIEF SUMMARY OF THE INVENTION

The invention provides a method for suppressing an interference signal during a data transmission of data symbols between two transceivers, comprising the following steps:
  transmitting a transmit data symbol sequence from a first transceiver to a second transceiver;
  detecting an interference signal, which has occurred during the data transmission, in dependence on a receive data symbol sequence;
  repeatedly transmitting the data symbol, transmitted last, of the transmit data symbol sequence from the first transceiver to the second transceiver when the interference signal occurs.

In one embodiment of the inventive method, from the data symbol, transmitted at least twice, of the transmit data symbol sequence, an undisturbed receive data symbol is retrieved in the second transceiver for further data processing.

In a further embodiment of the inventive method, the interference signal is detected by an interference signal detection circuit, provided in the first transceiver, in dependence on at least one disturbed data symbol, received by the first transceiver, of the data symbol sequence.

The position of the repetition of one or more symbols at the time of the interference signal may preferably be transmitted in an overhead channel from the first transceiver to the second transceiver.

In an alternative embodiment of the inventive method, the interference signal is detected by an interference signal detection circuit, provided in the second transceiver, in dependence on at least one disturbed data symbol, received by the first transceiver, of the data symbol sequence. The position of the repetition of one or more symbols at the time of the interference signal is transmitted from the second transceiver to the first transceiver in an overhead channel.

The data symbols may preferably be DMT data symbols.

The occurrence of an interference signal may be detected when a predetermined message is received which is transmitted from the second transceiver to the first transceiver in an overhead channel.

The undisturbed receive data symbol may be retrieved by reconstructing the undisturbed receive data symbol from the data symbols, may be transmitted at least twice, by assembling undisturbed data symbol sections of the two data symbols.

The undisturbed receive data symbol may be retrieved by selecting an undisturbed data symbol from a data symbol transmitted at least twice.

The data may be transmitted via telephone line.

Data transmission may be performed wirelessly between the transceivers.

The interference signal which has occurred may be reconstructed in the second transceiver from the data symbol, transmitted at least twice, of the transmit data symbol sequence.

In a further embodiment of the inventive method, the reconstructed interference signal forms a synchronization signal SYNC for synchronizing the transmit process of the transmit data symbol sequence.

The interference signal may be comprised of periodically occurring interference pulses.

The transceivers may be formed by xDSL transceivers.

The transceivers may be formed by VDSL transceivers.

The xDSL transceiver may be formed by ADSL transceivers.

The invention also provides a transceiver which suppresses periodically occurring interference signals which occur during a bidirectional data transmission.

The invention also provides an xDSL transceiver for transmitting data symbols, comprising:
- a transmitter for transmitting a data symbol of a transmit data symbol sequence via a data transmission channel to a remote xDSL transceiver;
- a receiver which detects an interference signal, which has occurred during the data transmission, in dependence on at least one data symbol, received by the xDSL transceiver, of a receive data symbol sequence,
- wherein the transmitter of the xDSL transceiver repeatedly transmits the data symbol, transmitted last, of the transmit data symbol sequence when the interference signal is detected by the receiver.

Thus, the inventive system is designed for suppressing interference signals which may occur during a bidirectional data transmission of data symbols between two transceivers.

The invention also provides a system for transmitting data symbols between two xDSL transceivers which in each case have a transmitter and a receiver.

The system comprises a first xDSL transceiver which has a transmitter which transmits a data symbol of a transmit data symbol sequence via a data transmission channel to a second xDSL transceiver, and a receiver which detects an interference signal, which has occurred during the data transmission, wherein the transmitter of the first xDSL transceiver repeatedly transmits the data symbol, transmitted last, of the transmit data symbol sequence via the data transmission channel to the second xDSL transceiver when the interference signal occurs.

In a preferred embodiment of the inventive system, the receiver of the second xDSL transceiver may retrieve from the data symbol, transmitted at least twice, of the transmit data symbol sequence an undisturbed receive data symbol for further data processing.

In a further, also preferred embodiment, the first xDSL transceiver and the second xDSL transceiver may be designed for transmitting the respective data symbols synchronously and at the same time via respective data transmission channels, a data symbol being repeated at the same time for both data transmission channels. In this manner, data symbols are transmitted synchronously and at the same time in each case in both directions of transmission.

In the further text, preferred embodiments of the inventive method for suppressing interference signals during a bidirectional data transmission of data symbols between two xDSL transceivers are described with reference to the attached figures of the drawing for explaining features essential to the invention.

DETAILED DESCRIPTION OF THE INVENTION

In the figures of the drawing, identical and functionally identical elements, features and signals have been provided with the same reference symbols unless stated otherwise.

Figure 4A:
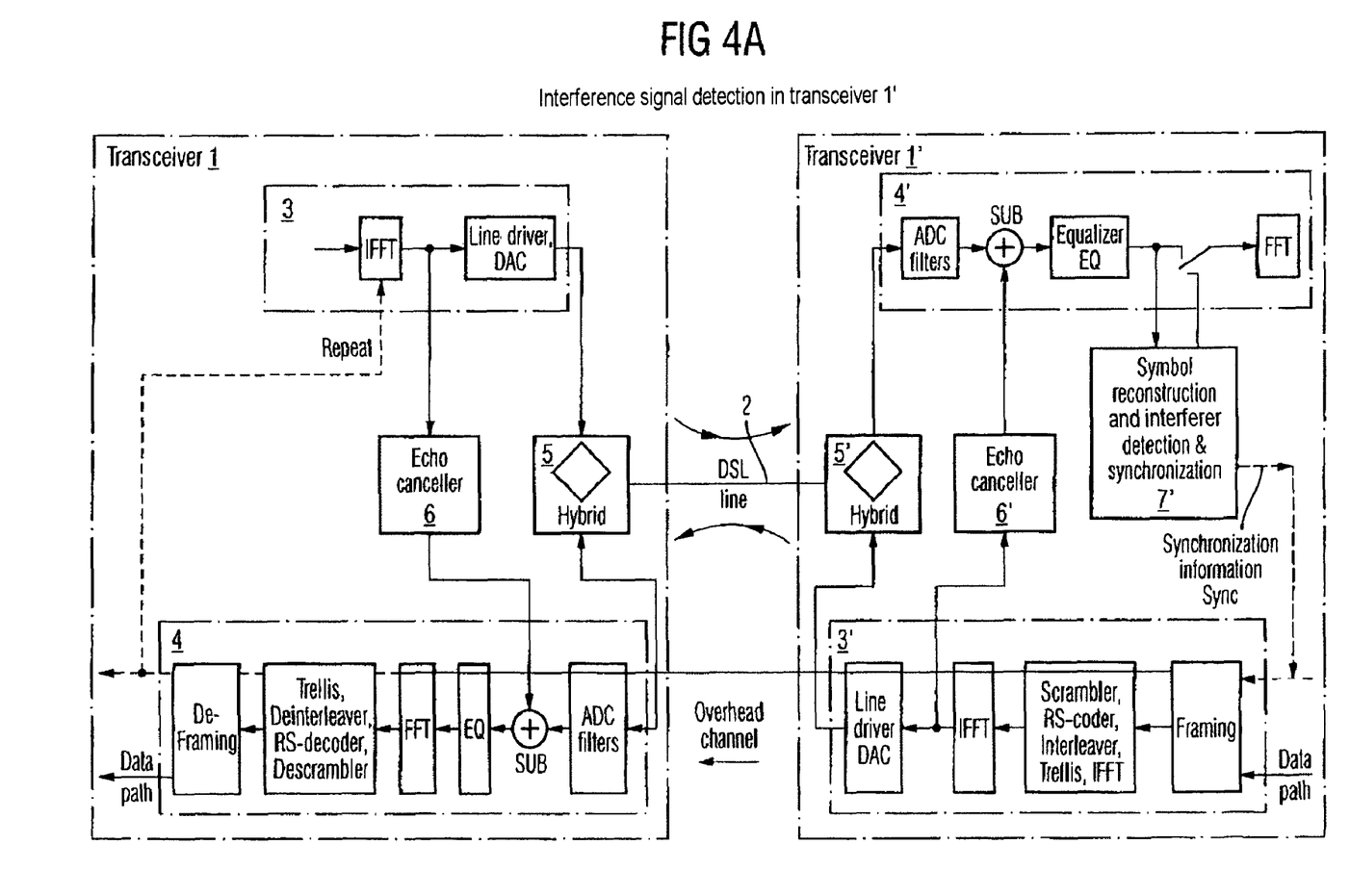
FIG. 4A is a block diagram for explaining the inventive method for suppressing an interference signal during a bidirectional data transmission of data symbols between two transceivers.
Figure 4B:
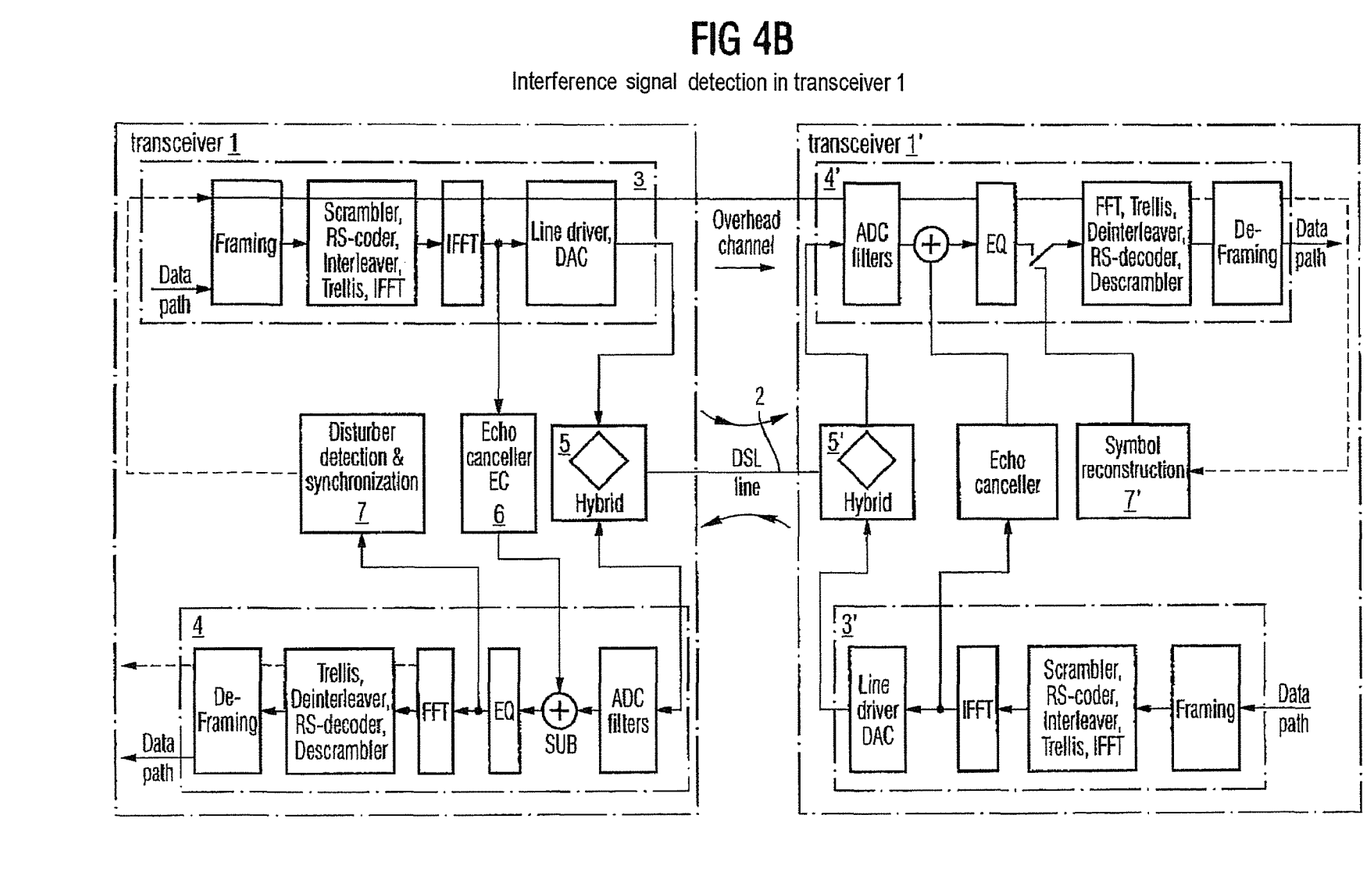
FIG. 4B is a further block diagram for explaining the inventive method for suppressing an interference signal during a bidirectional data transmission of data symbols between two transceivers.

FIGS. 4A and 4B show two block diagrams for explaining the method according to the invention for suppressing an interference signal during a bidirectional data transmission of data symbols between two transceivers.

In this arrangement, FIG. 4A shows a preferred embodiment of a data transmission system according to the invention with xDSL transceivers 1, 1', in which the interference signal S is suppressed during a bidirectional data transmission.

A first xDSL transceiver 1 is connected via a two-wire telephone line 2 to a data transmission system in which data from the first xDSL transceiver 1 are exchanged bidirectionally with a remote, identically constructed second xDSL transceiver 1'. The first xDSL transceiver 1 contains a transmit signal path 3 and a receive signal path 4. The transmit signal path 3 and the receive signal path 4 are connected to the two-wire telephone line 2 via a hybrid 5.

On the transmit signal path 3, a transmit signal bit sequence delivered by a data source is scrambled by a scrambler by means of a generator polynomial. A Reed-Solomon coder performs a forward error correction FEC, i.e. test values or test bytes are calculated which are appended to a useful data block to be protected. An interleaver then distributes the code words which are generated by the Reed-Solomon encoder over a greater range of time so that any transmission disturbances which may occur are divided or distributed over a number of code words.

A trellis encoder inserts further redundancy into the data stream by means of convolutional encoding.

An IFFT unit transforms the data symbols coded by the trellis encoder into a time domain signal which, after parallel and serial conversion and interpolation, is converted into an analogue output signal by a digital/analogue converter DAC. After low-pass filtering, the filtered analogue transmit signal is amplified by a driver circuit or line driver and delivered to the telephone line 2 via the hybrid 5.

On the receive signal path 4 of the xDSL transceiver 1, the received signal is first filtered by a low-pass filter for reducing aliasing effects and converted into a digital receive signal by an analogue/digital converter ADC. The digital receive signal is decimated by a decimation filter.

An echo compensation filter 6 connected to the output of the IFFT unit delivers a digital echo compensation signal to a subtractor within the receive signal path 4. The output of the subtractor is connected to a time domain equalizer EQ. The equalized receive signal then passes through an FFT unit, a trellis decoder, a deinterleaver, a Reed-Solomon decoder and a descrambler. After deframing, the receive signal is processed. If a circuit 7' for interference signal detection and data symbol reconstruction, which is provided in the second transceiver 1' and which is connected to the output of the equalizer EQ, detects a periodically occurring interference signal S, it generates a synchronization pulse (SYNC) and transmits the synchronization information to the first transceiver 1 via the telephone line 2 by means of an overhead message transmission channel. A particular number of bytes of the useful data of a code word are provided for the overhead message transmission channel. If, after receiving the code word, the first transceiver 1 detects that a synchronization information item has been transmitted in the overhead message transmission channel, a repeat control signal is delivered to the IFFT unit provided on the transmit signal path 3 of the first transceiver 1. The data signal transmitted last by the first transceiver 1 is then repeatedly transmitted.

The occurrence of an interference signal S can be detected by the first transceiver 1 by means of the circuit 7. In an alternative embodiment, the existence or occurrence of a periodic interference signal S in the transceiver 1 is reported by means of a message protocol.

In a possible further embodiment, which is also advantageous, the second remote transceiver 1' transmits a predetermined marking data symbol MDS to the first transceiver 1. The latter compares the received data symbols and detects the occurrence of an interference signal S when the received data symbol corresponds to the predetermined marking data symbol MDS.

In a preferred alternative embodiment, the occurrence of an interference signal S is reported to the first transceiver 1 by transmitting a special message within a code word by means of the overhead data transmission channel provided for this purpose. The FEC coding unit in the transmit signal path 3 receives useful data N from a scrambler and adds redundancy data R. The useful data and the redundancy data together provide a code word to be transmitted. A certain number of bytes within the useful data is reserved for the transmission of messages as overhead channel OHC. In the preferred embodiment, the other transceiver is informed via this overhead channel OHC that a periodic interference signal S has occurred during the data transmission. If the transceiver 1 receives this message, it will trigger a repeated transmission of the data symbol last transmitted by it.

Figure 5:
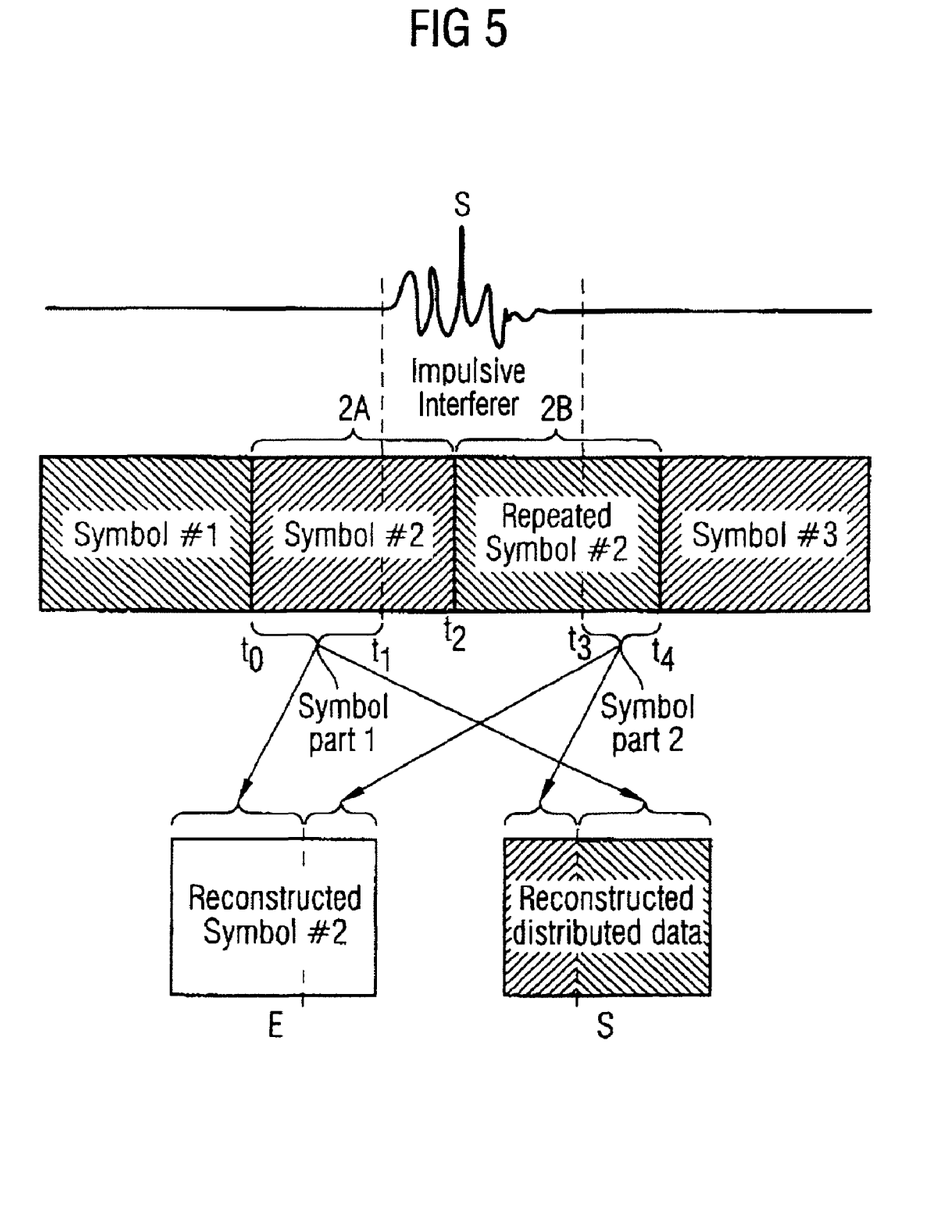
FIG. 5 is a diagram for explaining the operation of the inventive method for suppressing an interference signal during a bidirectional data transmission of data symbols between two transceivers.

FIG. 5 shows a diagram for explaining a preferred embodiment of the method according to the invention for suppressing an interference signal S and, respectively, the operation of an xDSL transceiver 1 according to the invention as shown in FIG. 4.

Firstly, the first xDSL transceiver 1 transmits a data symbol or transmit data symbols from the transmit signal path 3 via the hybrid 5 to the second xDSL transceiver 1'. The data symbols are preferably DMT data symbols.

If the detection circuit 7' of the second xDSL transceiver 1' detects that an interference signal S has occurred during the data transmission, it generates a synchronization signal SYNC. The interference signal detection circuit 7' detects the occurrence of an interference signal S in dependence on at least one data symbol, received by the second transceiver 1', of a receive data symbol sequence which is transmitted from the first transceiver 1 to the second transceiver 1' via the data transmission line 2.

As soon as the first transceiver 1 has received the synchronization signal SYNC from the second transceiver 1' via the overhead channel, it generates a repeat control signal for its IFFT unit. The repeat control signal causes the IFFT unit of the first transceiver 1 to repeat the transmission of the last data symbol transmitted of the transmit data symbol sequence. The transmit data symbol is repeated at least once so that it is transmitted at least twice overall.

The circuit 7' of the second xDSL transceiver 1', which is typically identically constructed to the first xDSL transceiver 1, reconstructs an undisturbed receive data symbol E from the data symbol, transmitted at least twice, of the transmit data symbol sequence, for further data processing. The reconstructed or retrieved data symbol E is inserted into the receive data symbol sequence by switching a switch within the receive signal path 4' of the second transceiver 1' to the output of the circuit 7' for symbol reconstruction for the duration of a symbol. After the retrieved data symbol E has been inserted into the receive data symbol sequence, the switch switches the input of the FFT unit back to the output of the equalizer EQ.

FIG. 4B illustrates the interference signal detection in the first transceiver 1.

A further variant is obtained from the combination of the variants according to FIGS. 4A and 4B. The repetition of the data symbols in both directions of transmission is always performed at the same time in this case. This is advantageous when both transceivers are in any case always disturbed at the same time in the case of a short transmission link. A residual echo from the transmit signal would not then influence the further processing of two successive symbols either since the echo is also repeated synchronously.

FIG. 5 shows the processing of the received data symbols by the xDSL transceiver 1 in the case of the occurrence of the interference signal S or of an interference pulse. When an interference pulse S occurs in the bidirectional data transmission, the transmit data symbol which occurred last is transmitted again on the transmit signal path 3, on the one hand, and, on the other hand, it can be assumed during symbol processing that the disturbed data symbol has also been transmitted twice by the second xDSL transceiver 1'. In the example shown in FIG. 5, the data symbol 2 is disturbed by a periodically occurring interference pulse S and received twice by the receive signal path 4. Each data symbol consists of a multiplicity of bits. With a symbol duration of 250 μs and a symbol rate of 4000 symbols per second, respectively, the number of bits per symbol is, for example, 2000 bits at a data transmission rate of 8 Mbit/sec.

As can be seen from FIG. 5, the data symbol 2 is transmitted twice, namely as symbol 2A and as symbol 2B, where the symbol 2B is an exact copy of the symbol 2A.

The start of the symbol 2A between time $t_0$ and time $t_1$ is not disturbed by the interference pulse S and is transmitted without errors. The end section of the symbol 2A, i.e. between times $t_1$, $t_2$ is disturbed by the interference pulse. In the same way, the start of the data symbol 2B, i.e. between times $t_2$, $t_3$, is disturbed by the interference pulse S overlapping at the boundary of the symbols 2A, 2B.

The end section of the data symbol 2B, i.e. between times $t_3$, $t_4$ is again undisturbed and is transmitted without errors. Typical interference signals S have a duration $T_S$ which is less than the duration $T_D$ of a transmitted data symbol. The duration $T_D$ of a transmitted data symbol is 250 μs in ADSL and 125 μs or 250 μs in VDSL. Typical interference signals or interference pulses such as those generated by dimmers, for example, have a duration $T_S$ of less than 100 μs. If the duration $T_S$ of the interference pulse S is less than the duration $T_D$ of a data symbol, it can be assumed that the start of the data symbol 2A, i.e. between times $t_0$, $t_1$, and the end of the data symbol 2B transmitted repeatedly, i.e. between times $t_3$, $t_4$ is undisturbed or free of errors even when the interference pulse S occurs at the boundary between the two data symbols 2A, 2B.

When an interference pulse S occurs, the symbol reconstruction circuit 7 as shown in FIG. 4 reconstructs from the data symbol 2, transmitted at least twice, i.e. from the two data symbols 2A, 2B, an undisturbed receive data symbol E by assembling the first part of the data symbol 2A between times $t_0$, $t_1$ and the second part of the data symbol 2B, i.e. between times $t_3$, $t_4$, to form an undisturbed data symbol E as is shown in FIG. 5. The time $t_1$ is determined by the beginning of the interference pulse S occurring. The time difference between time $t_3$ and time $t_1$ is determined by the data symbol duration $T_D$. The reconstructed receive data symbol E is evaluated in the receive signal path 4 and from this the useful data for further data processing are obtained. As soon as a disturbance S has occurred, the switch in the receive signal path 4 is placed at the output of the symbol reconstruction circuit so that the reconstructed receive data symbol E can be delivered to the FFT unit.

In a preferred embodiment of the method according to the invention, the interference signal S which has occurred is additionally reconstructed by the symbol reconstruction circuit 7 from the data symbol 2 which has been transmitted at least twice. The transmitted signal at the position of the interferer is reconstructed by subtracting the signal at the signal actually received. The symbol reconstruction circuit 7 subtracts from the received disturbed signal between times $t_1$, $t_3$ the reconstructed undisturbed data symbol E and thus regenerates the interference signal S as is shown diagrammatically in FIG. 5. This has the advantage that the interference signal S can be reconstructed and thus also identified.

Most of the interference signals S extend over a period of less than 100 μs, i.e. they are considerably shorter than the data symbol duration $T_D$ in VDSL or ADSL data transmission methods which have a duration of 250 and 125 μs respectively.

To avoid errors, the data symbols are repeated not only once but several times in the method according to the invention in data transmission methods which transmit data symbols which have a shorter data symbol duration $T_D$ than potential interference signals S. Instead of the presumably disturbed data symbol, the preceding data symbol is transmitted repeatedly in the method according to the invention. This has the advantage that an interference pulse occurring which overlaps data symbols, i.e. which is between and on the boundary of two data symbols does not lead to a loss of data. In addition, the interference signal S itself can be determined in the method according to the invention so that synchronization to this interference pulse is possible in a simple manner.

In an alternative embodiment of the method according to the invention, the data symbol is transmitted at least three times when an interference signal S is detected. At the receiving end, the undisturbed receive data symbol is then retrieved from the group of received, at least three data symbols by selecting an undisturbed data symbol. This is possible since the duration of the interference pulse is shorter than the duration $T_D$ of a data symbol, i.e. an interference pulse can corrupt two successively transmitted data symbols at a maximum. The third data symbol is free of errors even when an interference pulse occurs. At the receiving end, the data symbol which is undisturbed is then selected from the group of three data symbols when an interference signal S occurs or is detected.

Although the present invention has been explained above by means of a preferred exemplary embodiment, it is not restricted to this but can be modified in many different ways without deviating from the essence of the invention.

What is claimed is:

1. A method for suppressing an interference signal during a transmission of data symbols between two transceivers, comprising the steps of:
   transmitting a transmit data symbol sequence from a first transceiver to a second transceiver;
   detecting the interference signal, which has occurred during the transmission of the transmit data symbol sequence, in dependence on a received data symbol sequence; and
   repeatedly transmitting, from the first transceiver to the second transceiver, the data symbol of the transmit data symbol sequence, which data symbol was transmitted last, when the interference signal occurs.

2. The method of claim 1, further comprising the step of retrieving in the second transceiver an undisturbed received data symbol for further data processing, from the data symbol of the transmit data symbol sequence if the data symbol was transmitted at least twice.

3. The method of claim 2, further comprising the step of retrieving the undisturbed received data symbol by reconstructing the undisturbed received data symbol from a twice transmitted data symbol, by assembling undisturbed data symbol sections of the twice transmitted data symbol.

4. The method of claim 2, wherein said step of retrieving comprises retrieving the undisturbed received data symbol by selecting an undisturbed data symbol from the data symbol if the data symbol is transmitted at least three times.

5. The method of claim 1, further comprising the step of detecting the interference signal by an interference signal detection circuit provided in the first transceiver in dependence on at least one disturbed data symbol of the received data symbol sequence, wherein the at least one disturbed data symbol is received by the first transceiver.

6. The method of claim 1, further comprising the step of detecting the occurrence of the interference signal on reception of a predetermined marking data symbol which is transmitted from the second transceiver to the first transceiver.

7. The method of claim 1, wherein the data symbols are DMT data symbols.

8. The method of claim 1, further comprising the step of detecting the occurrence of the interference signal when a particular message is received, which message is transmitted from the second transceiver to the first transceiver over an overhead data transmission channel.

9. The method of claim 1, wherein the transmit data symbol sequence and the data symbol from the transmit data symbol sequence are transmitted bidirectionally via a telephone line.

10. The method of claim 1, further comprising reconstructing the interference signal in the second transceiver from the data symbol of the transmit data symbol sequence, which data symbol was repeatedly transmitted at least twice.

11. The method of claim 10, wherein the reconstructed interference signal forms a synchronization signal for synchronizing the transmission of the transmit data symbol sequence.

12. The method of claim 1, wherein the interference signal comprises a periodically occurring interference pulse.

13. The method of claim 1, wherein the first transceiver is a first xDSL transceiver and the second transceiver is a second xDSL transceiver.

14. The method of claim 1, wherein the first transceiver is a first VDSL transceiver or a first ADSL transceiver, and the second transceiver is a second VDSL transceiver or a second ADSL transceiver.

15. An xDSL transceiver for transmitting/receiving data symbols, comprising:
- a transmitter for transmitting a data symbol of a transmit data symbol sequence via a data transmission channel to a remote xDSL transceiver; and
- a receiver for detecting an interference signal, which has occurred during transmission of the data symbol, in dependence on at least one data symbol of a received data symbol sequence, said data symbol of the transmit data symbol sequence being received by the xDSL transceiver; the transmitter repeatedly transmitting the data symbol of the transmit data symbol sequence, which data symbol was transmitted last, when the receiver detects the interference signal.

16. A system for transmitting/receiving data symbols, comprising:
- a first xDSL transceiver which comprises a first transmitter and a first receiver; and
- a second xDSL transceiver which comprises a second transmitter and a second receiver;
- wherein the first transmitter transmits a data symbol of a transmit data symbol sequence via a data transmission channel to the second xDSL transceiver utilizing the second transmitter, and detecting, by utilizing the second receiver, an interference signal, which has occurred during transmission of the data symbol of the transmit data symbol sequence; and
- wherein the first transmitter repeats transmitting, via the data transmission channel to the second xDSL transceiver, the data symbol of the transmit data symbol sequence, which data symbol was transmitted last, when the interference signal occurs.

17. The system of claim 16, wherein the second receiver of the second xDSL transceiver retrieves an undisturbed received data symbol from the data symbol of the transmit data symbol sequence, which data symbol was transmitted at least twice, wherein the undisturbed received data symbol is used for further data processing.

18. The system of claim 16, wherein the first xDSL transceiver and the second xDSL transceiver are designed for transmitting/receiving respective data symbols synchronously and at the same time via respective data transmission channels, wherein a data symbol is repeated at the same time for the respective data transmission channels.

* * * * *